UNITED STATES PATENT OFFICE.

CHARLES WANZER, OF NEW YORK, N. Y.

IMPROVED CEMENT FOR SLATE ROOFING.

Specification forming part of Letters Patent No. 35,720, dated June 24, 1862.

*To all whom it may concern:*

Be it known that I, CHARLES WANZER, of the city, county, and State of New York, have invented a new and useful Composition of Matter, the same being a Cement for Slate Roofing; and I do hereby declare that the following is a full, clear, and exact description of the ingredients of the same with the proportions in which they are compounded and used.

This cement is designed for slate roofing of that class in which the slabs are laid without a lap, the ends simply abutting against each other as well as the sides.

The object of the invention is to obtain a cement which will be impervious to water, insoluble, and at the same time not harden by age, so as to be liable to crack and shell off from the surface to which it is applied. To this end I use a compound of grease pitch, one part; quicklime, two parts; Venetian red or ocher, two parts; linseed or other oil, one-half part. Instead of quicklime, chloride of lime or bleaching-powder may be used, two parts of the latter being equal to three of the former. Hydrate of lime and slaked lime may also be used, the proportion of the latter being equal to what the two parts of quicklime above given would make when slaked. These substances are simply mixed together, the thorough incorporation of the parts being expedited by a gentle heat. The grease pitch (commonly so-called) is the refuse of distilled grease or other oleaginous substance, and is of a rather tenacious or sticky nature, and when combined with the carbonate or the chloride of lime, Venetian red or other ocher, and the oil forms a cement which will not harden by age, so as to crack and peel or shell off. The oil reduces the body of the other substances and renders the cement sufficiently soft or plastic to be readily applied to the surface designed to receive it. The Venetion red or ocher gives a proper consistency to the cement by reducing the greasy nature of the "pitch," while the lime, or the chloride of lime or bleaching-powder, has an alkaline tendency, and saponifies to a certain extent, if not wholly, the oil and the grease in the pitch.

This cement is insoluble and impervious to water, and effectally retains the slate-slabs in proper position. After being compounded or freshly made it may be "worked"—that is to say, applied to the surface or foundation of the roof with great facility, and the slabs embedded in it without any trouble whatever. It hardens to a certain degree with age, but to a certain extent only, and without leaving any fissures or cracks.

I would remark that I prefer linseed-oil to other kinds; but fish-oil will answer passably well. Any of the ochers—yellow ocher, for instance—would answer instead of Venetian red.

I would remark that I prefer using the quicklime, although I have employed the chloride of lime or bleaching-powder with success. The latter is more expensive, and the quicklime seems to answer equally as good a purpose. Slaked lime also answers equally as well as the quicklime.

Having thus described my invention, what I claim as new, and desire to secure by Letters Patent, is—

A combination of grease pitch with the quicklime, or hydrate of lime, or the chloride of lime or bleaching-powder, Venetian red or other ocher, and linseed or other oil, about in the proportions specified, to form a cement for the purpose herein set forth.

CHAS. WANZER.

Witnesses:
  JAMES LAIRD,
  RICHARDSON GAWLEY.